UNITED STATES PATENT OFFICE.

GEORGE STEELE DUNCAN AND GEORGE HENRY POTTS, OF EDINBURGH, SCOTLAND, ASSIGNORS TO AMERICAN OFFSET COMPANY, OF NEW YORK, N. Y., A CORPORATION OF NEW YORK.

COMPOSITION FOR PREVENTING SET-OFFS IN PRINTING.

No. 823,674. Specification of Letters Patent. Patented June 19, 1906.

Application filed August 7, 1905. Serial No. 273,138.

*To all whom it may concern:*

Be it known that we, GEORGE STEELE DUNCAN and GEORGE HENRY POTTS, subjects of the King of the United Kingdom of Great Britain and Ireland, residing at Edinburgh, Scotland, have invented certain new and useful Improvements in Composition for Preventing Set-Offs in Printing, of which the following is a specification.

This invention has for its object the provision of an improved pomade or paste for greasing "set-off" rollers running in contact with the machine-cylinder. It is preferable to apply it when the machine is ready to start printing rather than when the machine is running, and it may be most conveniently applied by means of a clean rag saturated with turpentine or naphtha, which is dipped into the pomade or paste and the rollers then well rubbed with it, or it may be applied with the hand.

The pomade or paste is intended to be used in conjunction with one or other of the liquid compositions for preventing set-off which are the subject of applications for Letters Patent by both of us, although in some cases it may be preferred to use these liquid compositions alone—that is to say, without the pomade or paste, the subject of our present invention, as will probably be the case if the machine is one which registers badly. Although we have not found it desirable to use the pomade or paste alone, this may be done, and the result from the standpoint of preventing set-off will be better than if neither the pomade or paste nor any of such liquid compositions is used. There is described in the specification of application Serial No. 259,374 a pomade or paste intended to be similarly used, composed of black or soft soap, olive-oil, and turpentine. The pomade or paste the subject of our present invention has been found to possess advantages over the pomade or paste the subject of the said application in that for some classes of work the black or soft soap, even when its alkalinity is counteracted by the addition of lard, causes the parchment or other paper on the set-off cylinder to crack or break too readily. Although the pomade or paste, the subject of our present invention, contains soft soap, these drawbacks are absent.

The constituents of the pomade or paste, the subject of our present invention, are brown Windsor soap, turpentine as ordinarily used by printers, olive-oil, and soft soap. The best proportions are the following: eight parts, by volume, of turpentine to one and a half parts, by volume, of olive-oil; four pounds of brown Windsor soap for every quart of turpentine. The brown Windsor soap, turpentine, and olive-oil are heated together, under stirring, and soft soap gradually added until the consistency of the heated mass is about that of flour-paste, and the color of the product is substantially a pure white. The mass is then allowed to cool and when cool is ready for use.

Having now described our invention, what we claim, and desire to secure by Letters Patent of the United States, is—

1. A composition for preventing set-off comprising hard soap, soft soap, olive-oil, and turpentine.

2. A composition for preventing set-off comprising brown Windsor soap, soft soap, olive-oil and turpentine.

In testimony whereof we have signed our names to this specification in the presence of two subscribing witnesses.

GEORGE STEELE DUNCAN.
GEORGE HENRY POTTS.

Witnesses:
MARY McCREDIE,
WALLACE CRANSTON FAIRWEATHER.